US007996520B2

(12) United States Patent
Weil et al.

(10) Patent No.: US 7,996,520 B2
(45) Date of Patent: Aug. 9, 2011

(54) BEHAVIORAL CLASSIFICATION OF COMMUNICATION SESSIONS USING ACTIVE SESSION INITIATION

(75) Inventors: Ofer Weil, Modi'in (IL); Ravid Sagy, Zichron Yaacov (IL); Ido Feldman, Kfar Sava (IL)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 11/901,993

(22) Filed: Sep. 19, 2007

(65) Prior Publication Data

US 2009/0077228 A1    Mar. 19, 2009

(51) Int. Cl.
    G06F 15/173    (2006.01)
(52) U.S. Cl. ........................................ 709/224
(58) Field of Classification Search .................. 709/224
    See application file for complete search history.

(56) References Cited

U.S. PATENT DOCUMENTS

| | | |
|---|---|---|
| 4,414,644 A | 11/1983 | Tayler |
| 4,616,359 A | 10/1986 | Fontenot |
| 4,788,656 A | 11/1988 | Sternberger |
| 5,042,029 A | 8/1991 | Hayakawa |
| 5,050,162 A | 9/1991 | Golestani |
| 5,067,127 A | 11/1991 | Ochiai |
| 5,090,011 A | 2/1992 | Fukuta et al. |
| 5,167,033 A | 11/1992 | Bryant et al. |
| 5,193,151 A | 3/1993 | Jain |
| 5,339,398 A | 8/1994 | Shah et al. |
| 5,400,329 A | 3/1995 | Tokura et al. |
| 5,414,704 A | 5/1995 | Spinney |
| 5,444,706 A | 8/1995 | Osaki |
| 5,457,681 A | 10/1995 | Gaddis et al. |
| 5,463,620 A | 10/1995 | Sriram |
| 5,473,604 A | 12/1995 | Lorenz et al. |
| 5,617,421 A | 4/1997 | Chin et al. |
| 5,640,319 A | 6/1997 | Beuning et al. |
| 5,646,943 A | 7/1997 | Elwalid |
| 5,650,993 A | 7/1997 | Lakshman et al. |
| 5,673,263 A | 9/1997 | Basso et al. |
| 5,682,542 A | 10/1997 | Enomoto et al. |
| 5,701,418 A | 12/1997 | Luitje |
| 5,708,659 A | 1/1998 | Rostoker et al. |
| 5,715,250 A | 2/1998 | Watanabe |

(Continued)

OTHER PUBLICATIONS

Nmap—The Art of Port Scanning, Author: Fyodor, Published: Jun. 23, 2004 http://web.archive.org/web/20040623092350/www.insecure.org/nmap/nmap_doc.html.*

(Continued)

*Primary Examiner* — Jeffrey Pwu
*Assistant Examiner* — Noel Beharry
(74) *Attorney, Agent, or Firm* — Abelman, Frayne & Schwab

(57) ABSTRACT

A method includes measuring behavioral characteristics of a plurality of communication sessions in a communication network. A subset of the sessions is identified using the behavioral characteristics, such that the sessions in the subset are suspected of using a target communication protocol. A candidate session is selected from the subset. A trial communication session is initiated with a node of the communication network, which participates in the candidate session, using the target communication protocol. Responsively to receiving a positive response from the node to initiation of the trial communication session, it is determined that one or more further sessions in the plurality are using the target communication protocol. The one or more further sessions are controlled responsively to a predetermined control criterion that is applicable to the target communication protocol.

16 Claims, 2 Drawing Sheets

U.S. PATENT DOCUMENTS

Figure 1:
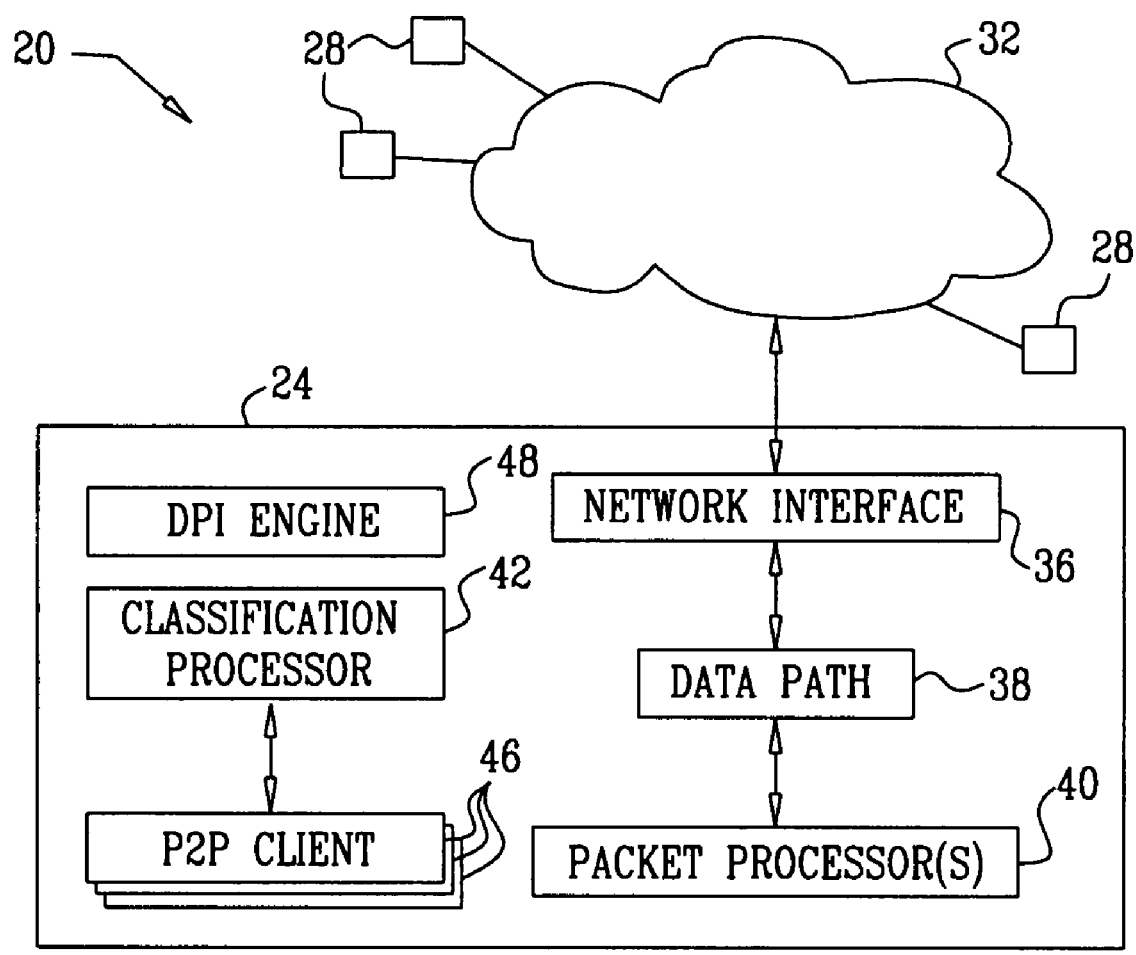

| Patent Number | Date | Inventor |
|---|---|---|
| 5,734,831 A | 3/1998 | Sanders |
| 5,742,239 A | 4/1998 | Siloti |
| 5,757,770 A | 5/1998 | Lagoutte et al. |
| 5,764,641 A | 6/1998 | Lin |
| 5,774,729 A | 6/1998 | Carney et al. |
| 5,781,545 A | 7/1998 | Matthew |
| 5,805,577 A | 9/1998 | Jain et al. |
| 5,806,086 A | 9/1998 | Kimmel et al. |
| 5,835,726 A | 11/1998 | Shwed et al. |
| 5,842,040 A | 11/1998 | Hughes et al. |
| 5,864,541 A | 1/1999 | Abu-Amara et al. |
| 5,898,837 A | 4/1999 | Guttman et al. |
| 5,901,138 A | 5/1999 | Bader et al. |
| 5,914,938 A | 6/1999 | Brady et al. |
| 5,914,945 A | 6/1999 | Abu-Amara et al. |
| 5,920,900 A | 7/1999 | Poole et al. |
| 5,936,939 A | 8/1999 | Des Jardins et al. |
| 5,936,940 A | 8/1999 | Marin et al. |
| 5,946,302 A | 8/1999 | Waclawsky et al. |
| 5,946,313 A | 8/1999 | Allan et al. |
| 5,949,786 A | 9/1999 | Bellenger |
| 5,951,651 A | 9/1999 | Lakshman et al. |
| 5,956,721 A | 9/1999 | Douceur et al. |
| 5,995,488 A | 11/1999 | Kalkunte et al. |
| 5,995,971 A | 11/1999 | Douceur et al. |
| 6,014,138 A | 1/2000 | Chain et al. |
| 6,018,524 A | 1/2000 | Turner et al. |
| 6,041,054 A | 3/2000 | Westberg |
| 6,075,769 A | 6/2000 | Ghanwani et al. |
| 6,104,696 A | 8/2000 | Kadambi et al. |
| 6,105,064 A | 8/2000 | Davis et al. |
| 6,134,217 A | 10/2000 | Stiliadis et al. |
| 6,157,823 A | 12/2000 | Fougnies et al. |
| 6,167,251 A | 12/2000 | Segal et al. |
| 6,185,187 B1 | 2/2001 | Ghanwani et al. |
| 6,185,198 B1 | 2/2001 | LaDue |
| 6,185,208 B1 | 2/2001 | Liao |
| 6,205,479 B1 | 3/2001 | Dulai et al. |
| 6,275,861 B1 | 8/2001 | Chaudri et al. |
| 6,292,489 B1 | 9/2001 | Fukushima et al. |
| 6,307,855 B1 | 10/2001 | Hariguchi |
| 6,404,752 B1 | 6/2002 | Allen et al. |
| 6,434,153 B1 | 8/2002 | Yazaki et al. |
| 6,460,120 B1 | 10/2002 | Bass et al. |
| 6,463,068 B1 | 10/2002 | Lin et al. |
| 6,529,508 B1 | 3/2003 | Li et al. |
| 6,535,482 B1 | 3/2003 | Hadi Salim et al. |
| 6,542,466 B1 | 4/2003 | Pashtan et al. |
| 6,542,508 B1 | 4/2003 | Lin |
| 6,590,894 B1 | 7/2003 | Kerr et al. |
| 6,608,816 B1 | 8/2003 | Nichols |
| 6,628,610 B1 | 9/2003 | Waclawsky et al. |
| 6,629,141 B2 | 9/2003 | Elzur et al. |
| 6,633,540 B1 | 10/2003 | Raisanen et al. |
| 6,633,920 B1 | 10/2003 | Bass et al. |
| 6,647,424 B1 | 11/2003 | Pearson et al. |
| 6,654,374 B1 | 11/2003 | Fawaz et al. |
| 6,657,962 B1 | 12/2003 | Barri et al. |
| 6,700,889 B1 | 3/2004 | Ben-Nun |
| 6,714,517 B1 | 3/2004 | Fawaz et al. |
| 6,788,697 B1 | 9/2004 | Aweya et al. |
| 6,831,893 B1 | 12/2004 | Ben Nun et al. |
| 6,839,767 B1 | 1/2005 | Davies et al. |
| 6,854,117 B1 | 2/2005 | Roberts |
| 6,928,482 B1 | 8/2005 | Ben-Nun et al. |
| 7,023,804 B1 * | 4/2006 | Younes et al. ............. 370/236 |
| 7,187,687 B1 | 3/2007 | Davis et al. |
| 7,237,058 B2 | 6/2007 | Drinivasan |
| 7,296,288 B1 * | 11/2007 | Hill et al. .................. 726/2 |
| 7,454,499 B2 * | 11/2008 | Cantrell et al. ........... 709/225 |
| 2001/0016899 A1 | 8/2001 | Nie |
| 2001/0054140 A1 | 12/2001 | Oberman et al. |
| 2002/0016856 A1 | 2/2002 | Tallegas et al. |
| 2002/0085563 A1 | 7/2002 | Mesh et al. |
| 2002/0099854 A1 | 7/2002 | Jorgensen |
| 2002/0122386 A1 | 9/2002 | Calvignac et al. |
| 2002/0165947 A1 | 11/2002 | Akerman et al. |
| 2002/0191543 A1 | 12/2002 | Buskirk et al. |
| 2003/0009618 A1 | 1/2003 | Regev et al. |
| 2004/0071135 A1 | 4/2004 | Jimmei et al. |
| 2004/0109451 A1 | 6/2004 | Huang et al. |
| 2004/0213222 A1 | 10/2004 | Assa et al. |
| 2005/0195845 A1 | 9/2005 | Mayhew et al. |
| 2006/0068806 A1 * | 3/2006 | Nam et al. ................. 455/452.2 |
| 2006/0212942 A1 * | 9/2006 | Barford et al. ............. 726/24 |
| 2006/0239219 A1 * | 10/2006 | Haffner et al. ............. 370/321 |
| 2007/0067841 A1 * | 3/2007 | Yegneswaran et al. ...... 726/23 |

OTHER PUBLICATIONS

Nmap Spoofing, Read Deal or Just a Nonsense, Author: Adrian F. Dimcev, Published: Feb. 8, 2007 http://www.carbonwind.net/Misc/NmapSpoofing/NmapSpoofing.htm.*

Identifying P2P users using traffic analysis, Author: Yiming Gong—Symantec, Published: Jul. 20, 2005 http://www.symantec.com/connect/articles/identifying-p2p-users-using-traffic-analysis.*

"Managing Peer-to-Peer Traffic with Cisco Service Control Technology", Published by Cisco Systems, Inc. Feb. 2005.

"Controlling Peer-to-Peer", Published by P-Cube, Inc., 2003.

"Cisco SCE 2000 Series Service Control Engine", Oct. 2006.

* cited by examiner

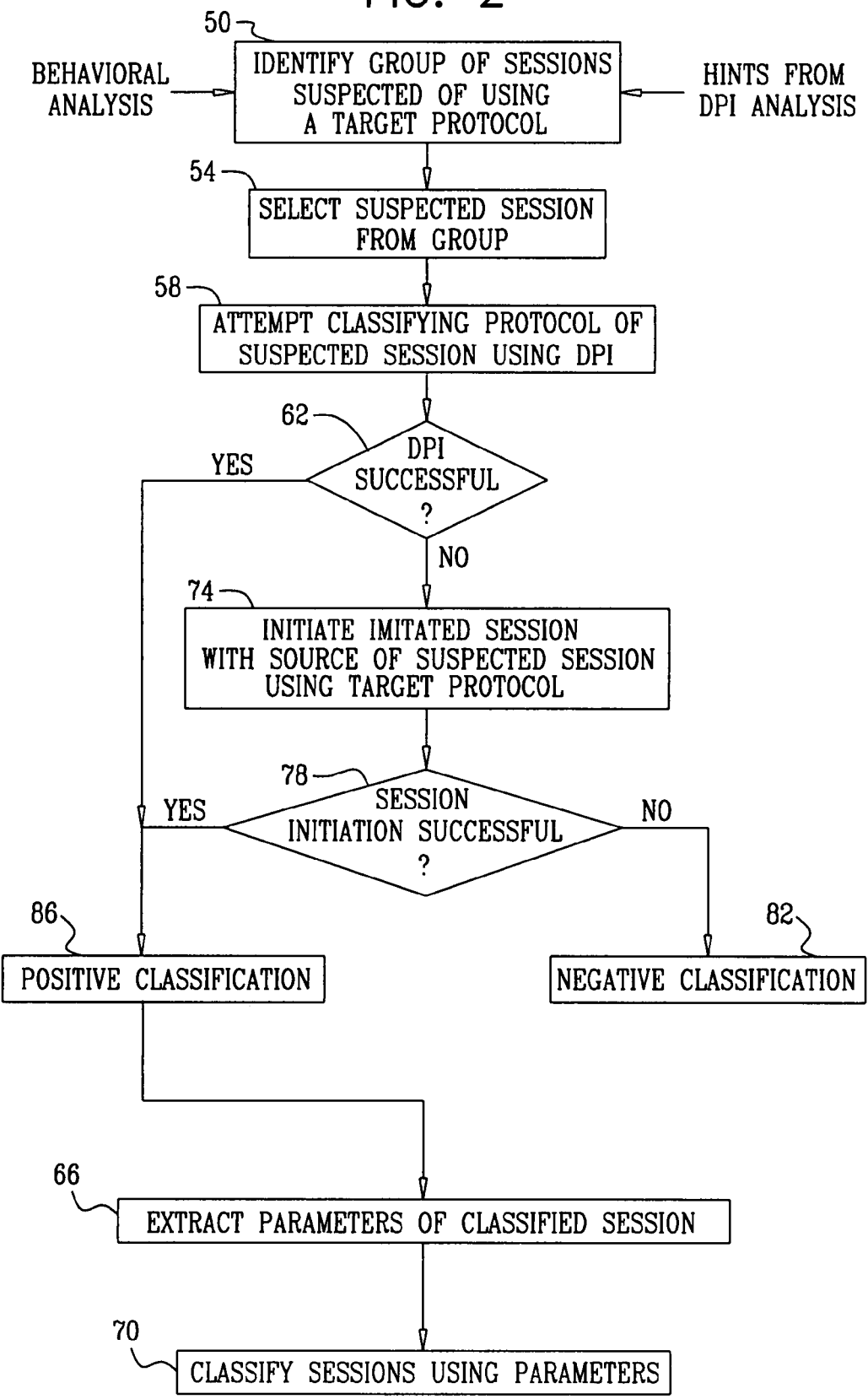

BEHAVIORAL CLASSIFICATION OF COMMUNICATION SESSIONS USING ACTIVE SESSION INITIATION

FIELD OF THE INVENTION

The present invention relates generally to communication networks, and particularly to methods and systems for classification of communication sessions.

BACKGROUND OF THE INVENTION

Various communication applications and network elements use Deep Packet Inspection (DPI) techniques to filter or otherwise control the flow of data packets. DPI methods examine and make decisions based on the data, or payload, carried by the data packets, and not only based on the packet headers. For example, the use of DPI methods for identifying and controlling Peer-to-Peer (P2P) traffic is described in a white paper entitled "Controlling Peer-to-Peer," published by P-Cube, Inc., 2003, which is incorporated herein by reference.

Cisco Systems, Inc. (San Jose, Calif.), offers an SCE 2000 Series Service Control Engine, which performs stateful application- and session-based classification and control of application-level Internet Protocol (IP) traffic using DPI techniques. The SCE 2000 carries out protocol monitoring in order to detect and control applications such as web browsing, multimedia streaming and peer-to-peer. The SCE 2000 product is described in a data sheet entitled "Cisco SCE 2000 Series Service Control Engine," October, 2006, which is incorporated herein by reference.

Service providers sometimes deploy network elements that use DPI techniques in order to identify and manage P2P traffic. The application of DPI techniques for managing P2P traffic are discussed, for example, in a white paper entitled "Managing Peer-to-Peer Traffic with Cisco Service Control Technology," published by Cisco Systems Inc. (San Jose, Calif., February, 2005), which is incorporated herein by reference.

The present invention will be more fully understood from the following detailed description of the embodiments thereof, taken together with the drawings in which:

DESCRIPTION OF EXAMPLE EMBODIMENTS

FIG. 1 is a block diagram that schematically illustrates a communication system that uses session classification, in accordance with an embodiment of the present invention; and FIG. 2 is a flow chart that schematically illustrates a method for session classification, in accordance with an embodiment of the present invention.

DETAILED DESCRIPTION OF EMBODIMENTS

Overview

Some communication protocols are difficult to identify using known DPI methods, for several reasons. For example, some protocols do not conform to a publicly-known standard or specification. Some emerging P2P protocols and clients are difficult to identify because they use obfuscation methods, specifically intended to avoid being identified by DPI systems. Such protocols use various cryptographic means, random padding, randomly changing port numbers and other measures. Other P2P protocols are difficult to identify because they have many different client types, or variants, which have different attributes. In particular, some P2P clients are distributed as open code software, enabling users to produce client variants quickly and easily. DPI systems often have difficulties in tracking the different protocol variants and attributes in order to identify the protocols. Thus, in many cases, DPI systems are having difficulties, and are often useless, in identifying certain types of communication protocols.

In view of these shortcomings of known DPI methods, embodiments of the present invention provide improved methods and systems for classifying network traffic. As will be shown below, the methods and systems described herein are based on behavioral characterization and not on an analysis of the packet content. As such, the behavioral methods and DPI methods can be regarded as complementary and can be used in conjunction with one another to achieve improved traffic identification and classification.

The methods and systems described herein automatically identify network traffic as belonging to a certain communication protocol. The protocol whose identification is sought is referred to herein as a target communication protocol. Typically but not necessarily, the target communication protocol comprises a P2P protocol. In some embodiments, a network element in a communication network identifies and controls communication sessions that use the target communication protocol. The network element monitors multiple communication sessions in the communication network, and initially attempts to identify sessions that are suspected of using the target protocol by measuring behavioral characteristics of the monitored sessions.

In the context of the present patent application and in the claims, the term "behavioral characteristic" is used to describe any characteristic of the form and progress of the session and not to the data (control information, user content or other data), which is conveyed in the packets. Several exemplary behavioral characteristics that can be used for identifying the suspected sessions are described below.

Having identified a subset of the sessions that are suspected of using the target protocol using behavioral characterization, the network element selects one of the sessions from the subset, referred to as a candidate session. The network element initiates an imitated communication session, using the target communication protocol, with a node that participates in the candidate session. For example, when the target protocol comprises a P2P protocol, the imitated session is typically initiated with a server that, which was used for content download in the candidate session. The node with which the trial session is initiated is referred to herein as a tested node.

The imitated session, also referred to as a trial session, is used as a means for positive identification of the protocol. In other words, if the tested node responds to the session initiation, the network element can positively conclude that the tested node indeed uses the target communication protocol. The active step of initiating a trial session using the target protocol increases the likelihood of correctly identifying the target protocol, and avoids false identifications that are common in behavioral classification methods.

Having positively determined that the candidate session and the nodes participating in it use the target communication protocol, the network element extracts one or more parameters from the candidate session and uses these parameters to determine whether other sessions use the target communication protocol. In particular, the network element may classify the other suspected sessions in the subset.

The network element can control the sessions identified as using the target communication protocol in a number of ways. For example, the network element may filter or block a certain protocol while allowing other protocols to pass. Additionally or alternatively, the network element can allocate network resources, such as bandwidth, memory and processor resources, to different sessions based on the communication protocols they use.

As will be explained below, the classification methods described herein can be used in conjunction with known DPI methods. For example, a DPI system can provide initial hints or suggestions for identifying the suspected sessions. Additionally or alternatively, the network element may initially attempt to classify sessions using DPI, and revert to the methods described herein when DPI fails.

The methods and systems described herein can identify the communication protocol used by a communication session, even when the protocol employs countermeasures intended to evade detection by DPI methods. Moreover, the processing complexity of the methods and systems described herein is considerably lower in comparison with DPI methods. Thus, a network element based on the disclosed classification methods can have lower cost and/or may handle larger amounts of traffic, without compromising classification accuracy and reliability.

System Description

FIG. 1 is a block diagram that schematically illustrates a communication system 20, in accordance with an embodiment of the present invention. System 20 comprises a network element (NE) 24. In the description that follows, NE 24 comprises a network-edge router that is operated by an Internet Service Provider (ISP), although the functions of NE 24 that are described herein can be embodied in various types of network elements, such as routers, switches, bridges and access concentrators.

NE 24 monitors communication sessions conducted among nodes 28 of a communication network 32. Network 32 comprises a packet network, typically an IP network, and may comprise a Wide Area Network (WAN) such as the Internet, a Metropolitan Area Network (MAN), a Local Area Network (LAN), an Intranet of a certain organization, a wireless network, or any other suitable communication network.

Nodes 28 of network 32 communicate with one another by conducting communication sessions. A communication session typically comprises sequences of data packets that are exchanged between the nodes. Each session is conducted in accordance with a certain communication protocol. For example, some of nodes 28 may communicate using P2P protocols such as Kazaa, eMule, Gnutella and BitTorrent. Typically, each node 28 comprises software clients of the communication protocol or protocols it uses.

A node may communicate with one or more other nodes within a given session. The point-to-point communication between a pair of nodes is referred to as a flow. When a session is held between two nodes, the session comprises a single flow. Other sessions may involve more than two nodes and comprise multiple flows. For example, in a P2P session, a node may download content from multiple nodes by opening respective multiple flows. A node may open and close multiple flows during a given session. A flow can be defined, for example, using a 5-tuple of the subscriber IP address and port, the network IP address and port, and the transport protocol used. Alternatively, flows may be defined using other suitable sets of parameters.

NE 24 comprises a network interface 36, which receives incoming data packets from network 32 and sends outgoing data packets to the network. A data path 38 processes the incoming and outgoing data packets. Data path 38 is typically implemented in hardware or firmware, and may be configured to perform various actions on incoming and outgoing data packets. For example, the data path may selectively filter out (i.e., block) certain communication sessions and/or limit the bandwidth allocated to certain sessions. NE 24 uses data path 38 to control certain communication sessions based on the communication protocols they use, as will be explained in detail below.

NE 24 comprises one or more packet processors 40, which carry out packet routing, bridging or other packet processing functions, depending on the desired functionality of the network element. NE 24 comprises a classification processor 42, which carries out the classification methods described herein. In particular, processor 42 attempts to identify sessions, which are conducted using one or more target communication protocols that are of interest. As part of the identification process, processor 42 sometimes initiates imitated, trial communication sessions with the nodes that originate sessions suspected as using the target protocols. For this purpose, NE 24 comprises one or more clients 46 of the target communication protocols.

In some embodiments, NE 24 applies DPI techniques in conjunction with the classification methods described herein. In these embodiments, NE 24 comprises a DPI engine 48, which analyzes data packets processed by NE 24 using DPI methods. In some embodiments, DPI engine 48 may comprise a known DPI system, such as the Cisco SCE 2000 product, cited above.

Typically, classification processor 42 comprises a general-purpose computer, which is programmed in software to carry out the functions described herein. The software may be downloaded to the computer in electronic form, over a network, for example, or it may alternatively be supplied to the computer on tangible media, such as CD-ROM. In some embodiments, the functions of processor 42 can be embodied in a DPI system, such as the SCE 2000.

Combined Behavioral and Active Session Classification

In various networks and applications, NE 24 is configured to provide differentiated service to different communication sessions, depending on the communication protocols they use. For example, an ISP may wish to block all sessions that use a certain P2P protocol, allocate only a certain amount of bandwidth to a certain protocol, assign different processing priorities to different protocols, or otherwise provide differentiated, protocol-dependent operation.

In order to provide such differentiated operation, communication sessions should be classified based on the protocols they use. As noted above, some communication protocols and clients are purposely designed to obfuscate identification and classification systems. For example, a Java-based BitTorrent client called Azureus uses data encryption and random-length packets. Other protocols have many different versions and variants that users develop over time.

FIG. 2 is a flow chart that schematically illustrates a method for session classification which overcomes these difficulties, in accordance with an embodiment of the present invention. The description that follows addresses the identification of a certain target P2P protocol. In alternative embodiments, however, the method can be used to identify any number of target protocols.

The method begins with NE 24 monitoring communication sessions conducted in network 32. Within the monitored communication sessions, classification processor 42 identifies a group of sessions that are suspected of using the target communication protocol, at a suspect group identification step 50.

Processor 42 identifies the suspected sessions by measuring behavioral characteristics of the monitored sessions, and selecting sessions whose behavioral characteristics are indicative of the target protocol.

For a certain monitored session, the behavioral characteristics evaluated by processor 42 may be based on, for example, the ratio between upstream and downstream traffic in the session, the distribution of packet sizes in the session, the distribution of packet arrival times, the number of open connections within the session, and/or the rate of opening of new connections during the session. Opening of both Transmission Control Protocol (TCP) and User Datagram Protocol (UDP) sessions between the same pair of nodes can also be used as a behavioral indication. Additionally or alternatively, any other suitable behavioral characteristic can be used. The behavioral characterization is not necessarily limited to the scope of a single session, and may sometimes be carried out over multiple sessions, e.g., past sessions of a certain user or node.

In some embodiments, DPI engine 48 may assist processor 42 in determining the suspected sessions. For example, the DPI engine can provide "hints" to processor 42, i.e., point to certain sessions that are likely to be of interest. The DPI engine may point to sessions based on, for example, the amount of bandwidth that the DPI process was unable to classify, the number of concurrent open flows, and/or any other logic, rule or heuristic.

Having collected a group of suspected sessions, processor 42 selects a candidate session from the group, at a candidate selection step 54. Processor 42 attempts to determine whether or not the candidate session indeed uses the target communication protocol.

In some embodiments, NE 24 initially attempts to classify the candidate session using DPI engine 40, at a DPI classification step 58. If the DPI engine is successful in classifying the candidate session, as checked at a DPI success checking step 62, classification processor 42 positively identifies the candidate session as using the target protocol, at a positive identification step 86.

Having positively classified the candidate session, processor 42 extracts one or more parameters from the candidate session, which will assist in associating other sessions with the target protocol, at a parameter extraction step 66. For example, some protocols use a constant port number. In such cases, a session having the behavioral characteristics of the target protocol and has the same port number as the positively-identified candidate session can be safely identified as using the target protocol, as well. As another exemplary parameter, some protocols, such as eMule, apply a padding pattern to the data packets. The padding pattern is constant per node, and therefore, when extracted, can be used to characterize other sessions of the host in question. Thus, when the target protocol comprises the eMule protocol, the padding pattern applied in the candidate session can be detected and used for associating other sessions of the same node that use the target protocol.

Processor 42 classifies other communication sessions using the parameters extracted from the candidate session, at a classification step 70. In particular, the other sessions in the group identified at step 50 above, which have the behavioral characteristics of the target protocol, can be classified using the extracted parameters. Additionally or alternatively, processor 42 may classify other sessions, such as subsequently-arriving sessions.

In some cases, however, the DPI process carried out at step 58 above fails to classify the candidate session. The DPI process may fail because of obfuscation measures of the protocol, or for any other reason. When the DPI process fails, as checked at step 62 above, processor 42 attempts to positively classify the candidate session using active means. Processor 42 initiates a trial communication session with a node that participated in the candidate session, at a session initiation step 74. The node with which the trial session is initiated is referred to as a tested node. When the target protocol comprises a P2P protocol, the tested node typically comprises a server, which was used for content download in the candidate session.

Processor 42 invokes one of clients 46 to initiate the trial session with the tested node using the target protocol. The assumption is that if the tested node responds to a session initiation that uses the target protocol, it can be safely identified as using this protocol. Typically, processor 42 attempts to connect to the IP address and port of the tested node.

Processor 42 checks whether the tested node responds to the trial session initiation, at an initiation success checking step 78. If the tested node responds correctly, i.e., responds using the target protocol, processor 42 positively associates the candidate session with the target protocol at step 86. The method continues, as described above, to extract parameters from the positively-classified candidate session and classify the other sessions using the extracted parameters. If the tested node does not respond correctly using the target protocol, processor 42 concludes that the candidate session does not use the target protocol, at a negative classification step 82.

In some embodiments, clients 46 choose the source IP addresses that they use in the trial session initiation in accordance with two objectives: (1) cause the trial session to be routed to network element 24, and (2) prevent "blacklisting" and "whitelisting" of the IP addresses used for trial sessions.

For example, in some embodiments clients 46 initiate the trial session using a temporary IP address that is within the same subnet mask of the IP address used by the tested node in the candidate session. This choice of IP address causes each trial session to use a different IP address, which prevents other nodes from detecting the trial sessions and "blacklisting" the IP addresses they use. In addition, since the trial session initiation uses the same subnet mask, the trial session will be routed via the same routing path as the candidate session, i.e., to NE 24.

Consider an exemplary scenario in which the candidate session is held between two nodes, referred to as a network-side node and a subscriber-side node. The network-side node uses an IP address denoted $IP_{net}$, and the subscriber-side node uses an IP address denoted $IP_{sub}$. In this scenario, when the tested node comprises the network-side node, NE 24 may contact the network-side node using a temporary IP address equal to $IP_{sub}+1$. When the tested node comprises the subscriber-side node, NE 24 may contact the subscriber-side node using a temporary IP address equal to $IP_{net}+1$. When IP+1 deviates from the subnet mask of the tested node, IP−1 can be used instead. Further alternatively, any other choice of IP address that remains within the subnet mask of the tested node can also be used.

Typically, the source port used in the trial session initiation is random. In alternative embodiments, NE 24 may select any other suitable choice of attributes, such as IP addresses and port numbers, for the trial session initiation.

In some embodiments, the method of FIG. 2 can be carried out without the presence or assistance of a DPI process. In these embodiments, steps 58 and 62 are omitted, and processor 42 actively initiates a trial session with the tested node without first attempting to classify the session using DPI.

Although the embodiments described herein mainly address classifying and controlling P2P protocols, the principles of the present invention can also be used for identifying and managing other types of communication protocols, such as Skype™, Yahoo!® Messenger, Post Office Protocol 3 (POP3) or any other protocol. Additionally or alternatively to managing sessions based on the communication protocols they use, the methods and systems described herein can be used to control sessions based on the communication services they consume (e.g., provide different service levels to web-browsing, video streaming and P2P sessions), and/or based on the applications they use.

In the embodiments described herein, the data packets pass through the network element, which classifies the sessions and regulates the packet flow. In alternative embodiments, however, the classification and regulation functions can be split between two different network elements. In other words, a first network element may identify the protocols and classify the sessions, and another network element, triggered by the first network element, may regulate the packet flow.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for identifying a peer-to-peer protocol of a communication session in an Internet Protocol (IP) packet network, the method comprising:
    using a Deep Packet Inspection (DPI) process to classify a plurality of communication sessions in the network;
    measuring an amount of unclassified bandwidth of the communication sessions which the DPI process was unable to classify;
    responsive to the unclassified bandwidth exceeding a predetermined level, measuring behavioral characteristics of the unclassified bandwidth according to a ratio between upstream and downstream traffic and a distribution of packet arrival times;
    identifying, using the behavioral characteristics, a subset of the plurality of communication sessions such that sessions in the subset are suspected of using a target peer-to-peer communication protocol;
    selecting a candidate session from the subset; initiating a trial communication session with a node of the network participating in the candidate session, wherein the trial communication session imitates the target peer-to-peer communication protocol;
    responsively to receiving a positive response from the node to initiation of the trial communication session imitating the target peer-to-peer communication protocol, determining that one or more further sessions in the plurality are using the target peer-to-peer communication protocol; and
    controlling the one or more further sessions responsively to a predetermined control criterion that is applicable to the target peer-to-peer communication protocol.

2. The method according to claim 1, wherein measuring the behavioral characteristics comprises measuring at least one characteristic selected from a group of characteristics consisting of a distribution of packet sizes, a number of open connections, a rate of opening new connections and a presence of Transmission Control Protocol (TCP) and User Datagram Protocol (UDP) sessions between a pair of network nodes.

3. The method according to claim 1, wherein determining that the one or more further sessions are using the target peer-to-peer communication protocol comprises extracting a parameter from data packets of the candidate session and verifying that the data packets in the one or more further sessions are using the extracted parameter.

4. The method according to claim 1, wherein determining that the one or more further sessions are using the target peer-to-peer communication protocol comprises verifying that at least some of the sessions in the subset, other than the candidate session, are using the target peer-to-peer communication protocol.

5. The method according to claim 1, wherein controlling the one or more further sessions comprises blocking the one or more further sessions.

6. The method according to claim 1, wherein controlling the one or more further sessions comprises allocating a resource of the network to the one or more further sessions.

7. The method according to claim 6, wherein the resource comprises at least one resource selected from a group of resources consisting of a bandwidth, a processing resource and a memory.

8. The method according to claim 1, wherein initiating the trial session imitating the target peer-to-peer communication protocol comprises contacting the node participating in the candidate session using a temporary Internet Protocol (IP) address.

9. The method according to claim 8, wherein contacting the node comprises selecting the temporary IP address responsively to the IP address used by the node, so as to cause the trial session imitating the target peer-to-peer communication protocol and the candidate session to have a common routing path in the network.

10. A network element for identifying a peer-to-peer protocol of a communication session in an Internet Protocol (IP) packet network, the network element comprising:
    a network interface, which is operative to communicate with the network; and
    a processor, which is coupled to:
    use a Deep Packet Inspection (DPI) process to classify a plurality of communication sessions in the network;
    measure an amount of unclassified bandwidth of the communication sessions which the DPI process was unable to classify;
    responsive to the unclassified bandwidth exceeding a predetermined level, measure behavioral characteristics of the unclassified bandwidth according to a ratio between upstream and downstream traffic and a distribution of packet arrival times;
    identify, using the behavioral characteristics, a subset of the plurality of communication sessions such that sessions in the subset are suspected of using a target peer-to-peer communication protocol;
    select a candidate session from the subset;
    initiate a trial communication session with a node of the network participating in the candidate session, wherein the trial communication session imitates the target peer-to-peer communication protocol;
    determine, responsively to receiving a positive response from the node to initiation of the trial communication session imitating the target peer-to-peer communication protocol, that one or more further sessions in the plurality are using the target peer-to-peer communication protocol; and
    control the one or more further sessions responsively to a predetermined control criterion that is applicable to the target peer-to-peer communication protocol.

11. The network element according to claim 10, wherein the behavioral characteristics comprise at least one characteristic selected from a group of characteristics consisting of a distribution of packet sizes, a number of open connections, a rate of opening new connections and a presence of Transmission Control Protocol (TCP) and User Datagram Protocol (UDP) sessions between a pair of network nodes.

12. The network element according to claim 10, wherein the processor is coupled to extract a parameter from data packets of the candidate session, and to determine that the one or more further sessions are using the target peer-to-peer communication protocol by verifying that the data packets in the one or more further sessions are using the extracted parameter.

13. The network element according to claim 10, wherein the processor is arranged to block the one or more further sessions upon determining that the one or more further sessions are using the target peer-to-peer communication protocol.

14. The network element according to claim 10, wherein the processor is arranged to control allocation of a resource of the network to the one or more further sessions upon determining that the one or more further sessions are using the target peer-to-peer communication protocol.

15. The network element according to claim 10, wherein the processor is arranged to contact the node participating in the candidate session using a temporary Internet Protocol (IP) address in the initiation of the trial session imitating the target peer-to-peer communication protocol.

16. A communication apparatus for identifying a peer-to-peer protocol of a communication session in an Internet Protocol (IP) packet network, comprising:

means for using a Deep Packet Inspection (DPI) process to classify a plurality of communication sessions in the network;

means for measuring an amount of unclassified bandwidth of the communication sessions which the DPI process was unable to classify;

means for, responsive to the unclassified bandwidth exceeding a predetermined level, measuring behavioral characteristics of the unclassified bandwidth according to a ratio between upstream and downstream traffic and a distribution of packet arrival times;

means for identifying, using the behavioral characteristics, a subset of the plurality of communication sessions such that sessions in the subset are suspected of using a target peer-to-peer communication protocol;

means for selecting a candidate session from the subset;

means for initiating a trial communication session using the target peer-to-peer communication protocol with a node of the network participating in the candidate session, wherein the trial communication session imitates the target peer-to-peer communication protocol;

means for determining, responsively to receiving a positive response from the node to initiation of the trial communication session imitating the target peer-to-peer communication protocol, that one or more further sessions in the plurality are using the target peer-to-peer communication protocol; and means for controlling the one or more further sessions responsively to a predetermined control criterion that is applicable to the target peer-to-peer communication protocol.

\* \* \* \* \*